United States Patent
Shin

(10) Patent No.: US 8,810,239 B2
(45) Date of Patent: Aug. 19, 2014

(54) ANGLE SENSOR

(75) Inventor: Sungchul Shin, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 204 days.

(21) Appl. No.: 13/333,205

(22) Filed: Dec. 21, 2011

(65) Prior Publication Data

US 2012/0153938 A1 Jun. 21, 2012

(30) Foreign Application Priority Data

Dec. 21, 2010 (KR) .................. 10-2010-0131195

(51) Int. Cl.
*G01B 7/14* (2006.01)
(52) U.S. Cl.
USPC .......... 324/207.22; 33/1 N; 91/375; 180/426; 72/360; 72/337
(58) Field of Classification Search
USPC .......... 324/207.22; 33/1 N; 91/375; 180/426; 72/360, 337
See application file for complete search history.

(56) References Cited

U.S. PATENT DOCUMENTS

| | | | |
|---|---|---|---|
| 7,665,573 B2 * | 2/2010 | Lee et al. ...................... | 180/444 |
| 2006/0102697 A1 * | 5/2006 | Nagai et al. .................. | 228/101 |
| 2007/0169986 A1 * | 7/2007 | Choi et al. .................... | 180/444 |
| 2008/0127755 A1 * | 6/2008 | Kim .............................. | 73/865.9 |
| 2009/0032352 A1 * | 2/2009 | Pritchard et al. ............. | 192/3.52 |
| 2010/0185412 A1 * | 7/2010 | Abe et al. ..................... | 702/151 |
| 2011/0121824 A1 * | 5/2011 | Sterling .................... | 324/207.22 |

* cited by examiner

*Primary Examiner* — Huy Q Phan
*Assistant Examiner* — Temilade S Rhodes-Vivour
(74) *Attorney, Agent, or Firm* — Saliwanchik, Lloyd & Eisenschenk

(57) ABSTRACT

Disclosed is an angle sensor, which is capable of accurately measuring an angle of a steering shaft by selecting an optimum gear ratio between main and subsidiary gears constituting the angle sensor, measures a rotation amount of a vehicle steering shaft, and includes a ring-shaped main gear rotating along with the steering shaft, a first subsidiary gear rotated by rotation of the main gear and having a magnet coupled to a surface thereof, and a magnetic device detecting a change in magnetic field of the magnet and outputting data on a rotation amount, so that the first subsidiary gear rotates four times while the main gear rotates once, and a value of a scale factor is minimized during a process of acquiring valid data for measuring the angle of the main gear and thereby an error of a measured value is minimized.

5 Claims, 2 Drawing Sheets

ANGLE SENSOR

CROSS-REFERENCE TO RELATED APPLICATION

This application claims the benefit under 35 U.S.C. §119 of Korean Patent Application No. 10-2010-0131195, filed Dec. 21, 2010, which is hereby incorporated by reference in its entirety.

BACKGROUND

1. Field of the Invention

The present invention relates generally to an angle sensor and, more particularly, to an angle sensor, which is capable of accurately measuring an angle of a steering shaft by selecting an optimum gear ratio between main and subsidiary gears constituting the angle sensor.

2. Description of the Related Art

Generally, an auxiliary steering system supported by additional power is used as a device for ensuring the steering stability of a vehicle. Conventionally, the auxiliary steering system uses a hydraulic pressure. However, recently, an electronic power steering system, which consumes less power and is excellent in accuracy, has been used.

Such an electronic power steering system (EPS) drives a motor by an electronic control unit depending on driving conditions detected by a vehicle speed sensor, an angle sensor and a torque sensor, thus ensuring stability in turning and providing a rapid restoring force, and thereby allowing a driver to safely drive a vehicle.

The angle sensor is a device that outputs an electric signal in proportional to a rotation angle of a steering shaft. Recently, the angle sensor is frequently combined with the torque sensor measuring steering torque to form an assembly.

FIG. 1 is a plan view illustrating an example of the angle sensor.

In the case of the angle sensor, as a driver rotates a steering wheel, a main gear 20 attached to a steering shaft rotates in conjunction with the steering wheel, and there occurs a difference in rotation angle between input and output shafts of the steering shaft. At this time, a magnetic device detects magnetic fields and rotating directions of magnets 31 and 32 attached to subsidiary gears 21 and 22 engaging with the main gear 20, and thereafter sends a detected signal to an electronic control unit.

The main gear 20 and the subsidiary gears 21 and 22 are configured to have a predetermined gear ratio. Commonly, the number of teeth formed on an outer circumference of the main gear 20 is greater than that of each subsidiary gear 21 or 22.

For example, as in the general case, if the gear ratio of the main gear to the subsidiary gear is 2:1, the subsidiary gear rotates twice when the main gear rotates once. Digital output of a Hall sensor detecting a change in magnetic field of the magnet is multiplied by a gain corresponding to a predetermined scale factor, and thus a rotation amount is measured using a 14-bit timer counter.

Here, since the number of rotations of the main gear must be detected via the number of rotations of the subsidiary gear, the scale factor may affect accuracy in measuring the number of rotations of the main gear. Consequently, the conventional angle sensor is problematic in that a value of the scale factor is large, so that an error in measurement of a rotation amount occurs.

BRIEF SUMMARY

Accordingly, the present invention has been made keeping in mind the above problems occurring in the prior art, and an object of the present invention is to provide an angle sensor, which is capable of minimizing an error in measuring rotation of a steering shaft by selecting an optimum gear ratio between main and subsidiary gears of the angle sensor.

According to one aspect of this invention, there is provided an angle sensor which measures a rotation amount of a vehicle steering shaft and includes a ring-shaped main gear rotating along with the steering shaft, a first subsidiary gear rotated by rotation of the main gear and having a magnet coupled to a surface thereof, and a magnetic device detecting a change in magnetic field of the magnet and outputting data on a rotation amount, so that the first subsidiary gear rotates four times while the main gear rotates once. Therefore, the angle sensor is advantageous in that a value of scale factor is minimized while valid data for measuring an angle of the main gear is acquired, so that an error in the measured value is minimized.

The angle sensor further includes a second subsidiary gear engaging with the main gear, wherein the first subsidiary gear engages with the second subsidiary gear, and a gear ratio of the main gear to the first subsidiary gear is 4:1. Therefore, the angle sensor is advantageous in that high sensitivity to a change in magnetic field is achieved and nonlinearity of data on the measured value is improved.

Further, the magnetic device comprises a Hall IC. Therefore, the angle sensor is advantageous in that an output signal can be efficiently analyzed by a change in magnetic field.

As apparent from the above description, the angle sensor according to the present invention is advantageous in that an optimum gear ratio is set between the main and subsidiary gears, so that an error ratio of the magnetic device is reduced without lowering detection efficiency for a change in magnetic field, thus increasing nonlinearity of output data, and enabling precise angle measurement.

DETAILED DESCRIPTION

An angle sensor according to a preferred embodiment of the present invention will be described below in detail with reference to the accompanying drawings.

Figure 1:
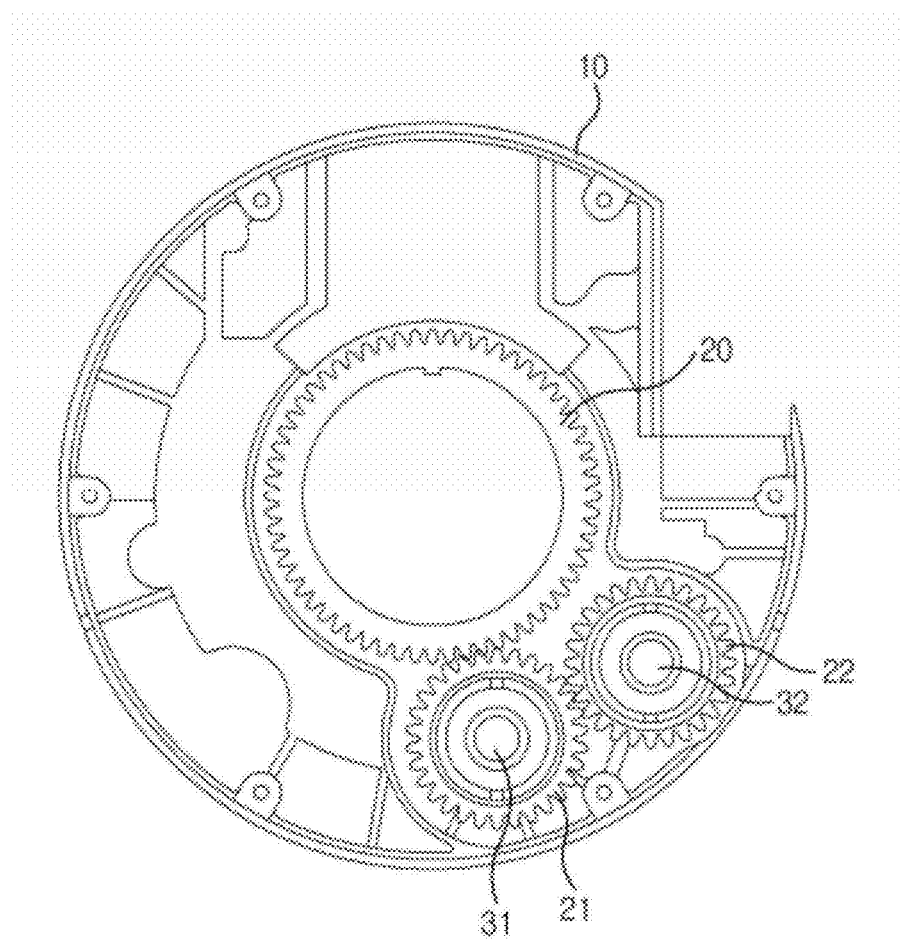
FIG. 1 is a plan view showing a conventional angle sensor.

Hereinafter, the angle sensor according to the present invention will be described with reference to the construction of the angle sensor shown in FIG. 1.

Further, the angle sensor includes a ring-shaped main gear 20 rotating along with a steering shaft of a vehicle, a second subsidiary gear 21 engaging with the main gear 20, and a first subsidiary gear 22 engaging with the second subsidiary gear 21.

The gears 20, 21, and 22 are rotatably coupled to one surface of a casing 10. The casing 10 approximately takes a shape of a disc, and an opening is formed in a central portion of the casing 10 to correspond to a hollow portion of the main gear 20.

The steering shaft of the vehicle is connected to a central portion of the main gear 20 to rotate along therewith.

As the main gear 20 rotates, the second subsidiary gear 21 rotates reversely with respect to the rotating direction of the main gear 20, and the first subsidiary gear 22 rotates forwards.

In consideration of accuracy in measurement of a rotation amount and arrangement relationship, it is preferable that the gear ratio of the second subsidiary gear 21 to the first subsidiary gear 22 be 1:1.

The angle sensor may be solely coupled to the steering shaft, but may be integrated with a torque sensor. In the latter case, the torque sensor is provided on the other surface of the casing 10, and the steering shaft passes through the torque sensor and the angle sensor.

As described above, an error in measurement of a rotation amount may occur according to the gear ratio between the main gear 20 and the first subsidiary gear 22.

Figure 2:
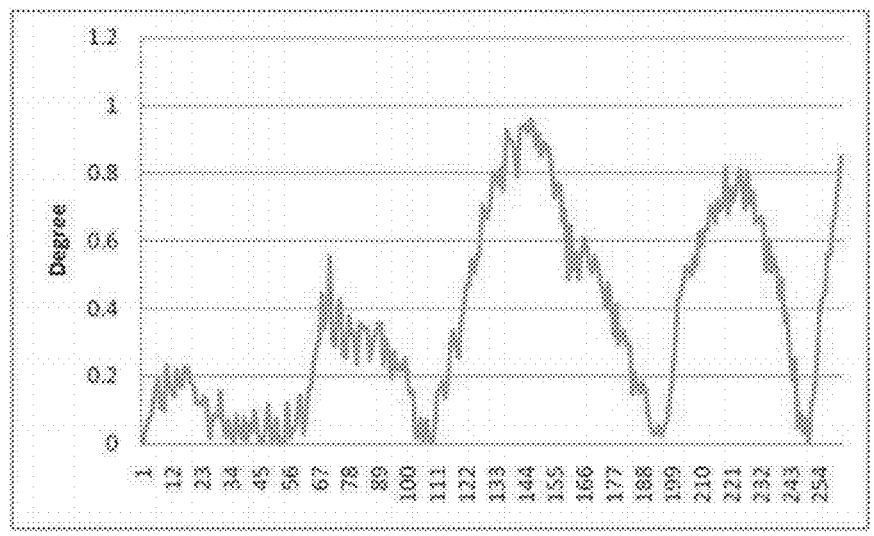
FIG. 2 is a graph showing an error of a measured rotation amount as a function of a rotation amount of a main gear in the conventional angle sensor.

FIG. 2 is a graph showing an error of a measured value as a function of the rotation amount of the main gear when the gear ratio of the main gear to the subsidiary gear is 2:1. In this graph, a horizontal axis represents the rotation amount of the main gear in a scale of degree, while a vertical axis represents a difference between an actual rotation amount of the main gear and a measured value by way of a scale of degree.

To be specific, a magnetic device detecting a change in magnetic field of the first subsidiary gear 22 generates a digital output of 0 to 16,383 steps corresponding to 14 bit. Hence, if the gear ratio is 2:1, the first subsidiary gear 22 generates an output twice when the main gear 20 rotates once.

A pulse-width modulated output is quadrantly divided to generate an output at a 90-degree interval, using the output of the first subsidiary gear 22, more accurately, the output of the magnetic device detecting a change in magnetic field of the second magnet 32 coupled to the first subsidiary gear 22.

The output obtained by the PWM is expressed by an angle through a 14-bit timer counter, and a step value uses data of about 25% to 83% from the lowest limit. Here, the range of the data is set to 2,400 to 13,600.

Thus, while the main gear 20 rotates 90 degrees, output data through the first subsidiary gear 22 is within the range of 0 to 8,192 which is half of full data. This value is multiplied by a given scale factor to be converted into data of the set range, namely 2,400 to 13,600, thus measuring an angle.

As described above, the range of error may vary according to the scale factor.

FIG. 2 shows the graph when the gear ratio of the main gear 20 to the first subsidiary gear 22 is 2:1. While the main gear 20 rotates about 250 degrees, the maximum error of the measured value regarding a rotation amount is approximately 1 degree. At this time, certain linearity shows between data of the horizontal axis because of the influence of the scale factor.

Therefore, the present invention provides the angle sensor, in which the gear ratio of the main gear to the subsidiary gear is set to be 4:1 so as to minimize an error in steering angle by reducing the error in the rotation amount and the linearity.

In this case, while the main gear 20 rotates 90 degrees, the first subsidiary gear 22 rotates once, that is, rotates 360 degrees. Consequently, the output generated by the first subsidiary gear 22 is represented as data having the value of 0 to 16,383 corresponding to full data of 14 bit. Hence, in order to extract data of 2,400 to 13,600 that is the set range, a scale factor of a small value may be used.

According to such a concept, the error ratio of the magnetic device is reduced. As a result, non-linearity of output data may be increased.

Figure 3:
FIG. 3 is a graph showing an error of a measured rotation amount as a function of a rotation amount of a main gear in an angle sensor according to the present invention.

FIG. 3 is a graph showing an error of a measured value as a function of a rotation amount of the main gear of the angle sensor according to the present invention.

It can be seen that the error of the measured value shown in the vertical axis is less than 0.5 degrees while the main gear 20 rotates about 250 degrees. This error range is reduced to a half of that of FIG. 2 wherein the gear ratio is 2:1, so that linearity between data can be reduced.

Meanwhile, in order to efficiently utilize a bit-unit output in response to a change in magnetic field, it is preferable that the magnetic device be a Hall IC.

According to the embodiment of the present invention, the second subsidiary gear 21 and the first subsidiary gear 22 have the same gear ratio, and have the gear ratio of 4:1 with respect to the main gear 20. Thus, a difference in gear ratio may be explained as a difference in radius. That is, the radius ratio of the main gear 20 to the first subsidiary gear 22 may be 4:1.

Of course, the second subsidiary gear 21 and the first subsidiary gear 22 may be different in number of gear teeth from each other, and a plurality of gears may be interposed between the main gear 20 and the first subsidiary gear 22.

In this case, the term of the gear ratio should be changed into a difference in rotation amount. That is, the ratio of the rotation amount of the main gear to the subsidiary gear measuring the rotation amount of the main gear is set to be 1:4.

That is, as described above, in the case of dividing an output value into four parts at angular intervals of 90 degrees of the main gear 20 and measuring the output value, it is most preferable to have the gear ratio of 4:1 capable of approximately outputting full data, in consideration of sensing ability of the magnetic device and arrangement between gears. That is, since a magnetization position and a size of the magnet must be considered to efficiently sense the magnetic field and the Hall IC measuring a change in magnetic field of the magnet is spaced apart from the Hall IC by a predetermined interval, the subsidiary gear requires a predetermined radius. Therefore, the optimum gear ratio for efficiently sensing changes in magnetic field of the main and subsidiary gears and minimizing a measurement error becomes 4:1.

Of course, the rotation amount of the subsidiary gear measuring the rotation amount of the main gear may be a multiple of 4 according to selected structure.

The foregoing description of the preferred embodiment has been presented for the purpose of illustration and description. It is not intended to limit the scope of the invention. It is intended that the scope of the invention be defined by the claims.

What is claimed is:

1. An angle sensor, comprising:
   a ring-shaped main gear configured to rotate with a steering shaft;
   a second subsidiary gear engaged with the main gear, including a second magnet being coupled to a surface of the second subsidiary gear;
   a first subsidiary gear engaged with the second subsidiary gear and configured to rotate by rotation of the main gear, with a first magnet being coupled to a surface of the first subsidiary gear; and
   a magnetic device detecting a change in magnetic field of the first magnet or the second magnet and outputting data of a rotation amount;
   wherein the first subsidiary gear is configured to rotate four times while the main gear rotates once, such that a rotation amount of the steering shaft is measured, and
   wherein when the main gear rotates, the second subsidiary gear rotates reversely with respect to rotating direction of the main gear, while the first subsidiary gear rotates in a same rotating direction as that of the main gear.

2. The angle sensor as set forth in claim 1, wherein a gear ratio of the main gear to the first subsidiary gear is 4:1.

3. The angle sensor as set forth in claim 1, wherein the magnetic device comprises a Hall IC.

4. The angle sensor as set forth in claim 2, wherein the magnetic device comprises a Hall IC.

5. The angle sensor as set forth in claim 1, wherein a gear ratio of the first subsidiary gear to the second subsidiary gear is 1:1.

* * * * *